Sept. 11, 1962 R. D. NEYER 3,053,089
DIFFERENTIAL DIFFRACTION LIQUID LEVEL GAUGE
Filed Oct. 31, 1957 4 Sheets-Sheet 1
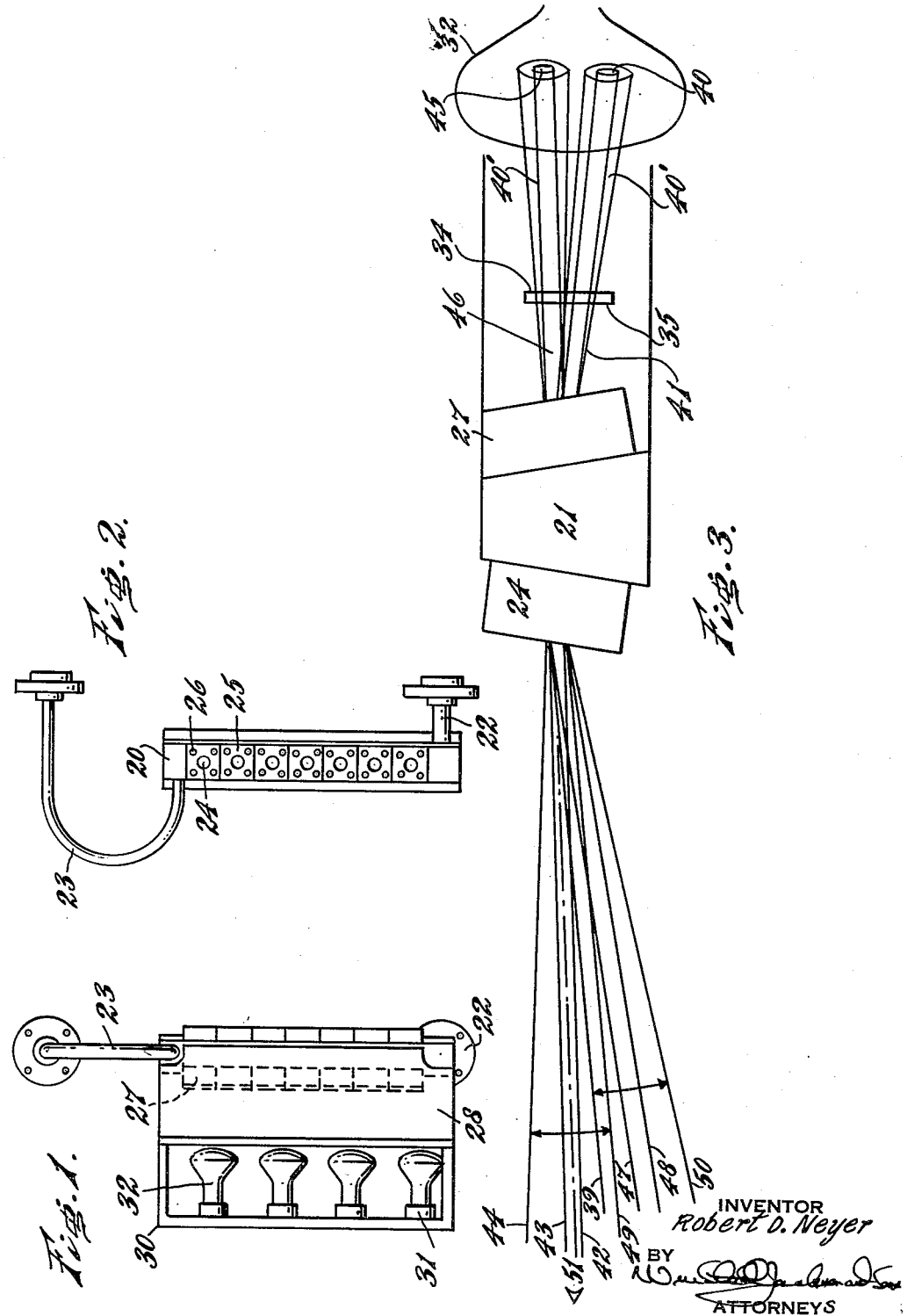
INVENTOR
Robert D. Neyer
BY
ATTORNEYS Sept. 11, 1962 R. D. NEYER 3,053,089
DIFFERENTIAL DIFFRACTION LIQUID LEVEL GAUGE
Filed Oct. 31, 1957 4 Sheets-Sheet 2
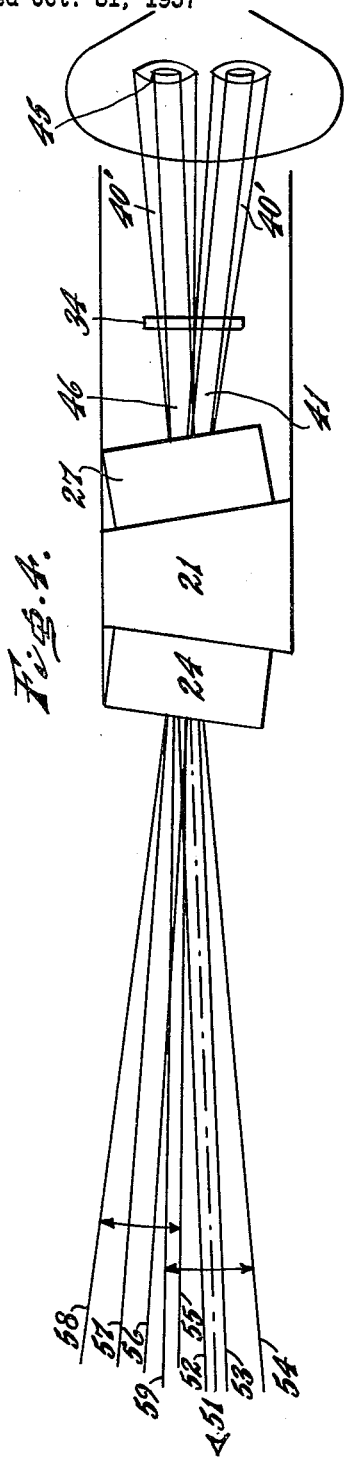
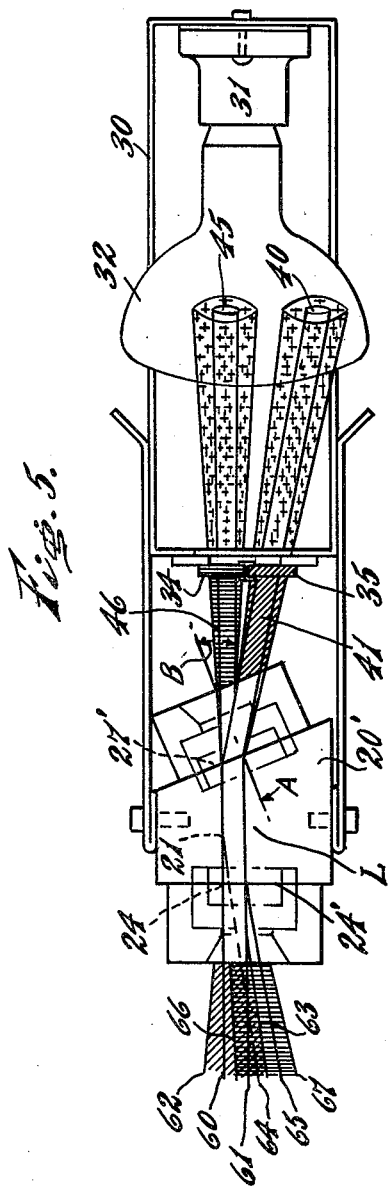
INVENTOR
Robert D. Neyer
BY
ATTORNEYS Sept. 11, 1962 R. D. NEYER 3,053,089
DIFFERENTIAL DIFFRACTION LIQUID LEVEL GAUGE
Filed Oct. 31, 1957 4 Sheets-Sheet 3
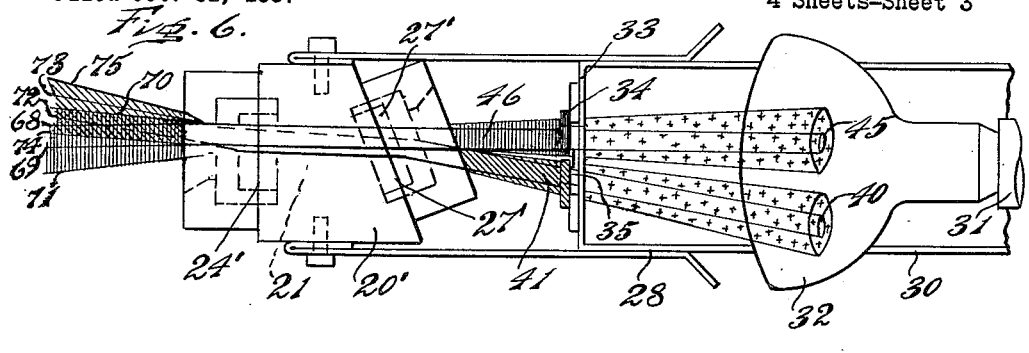
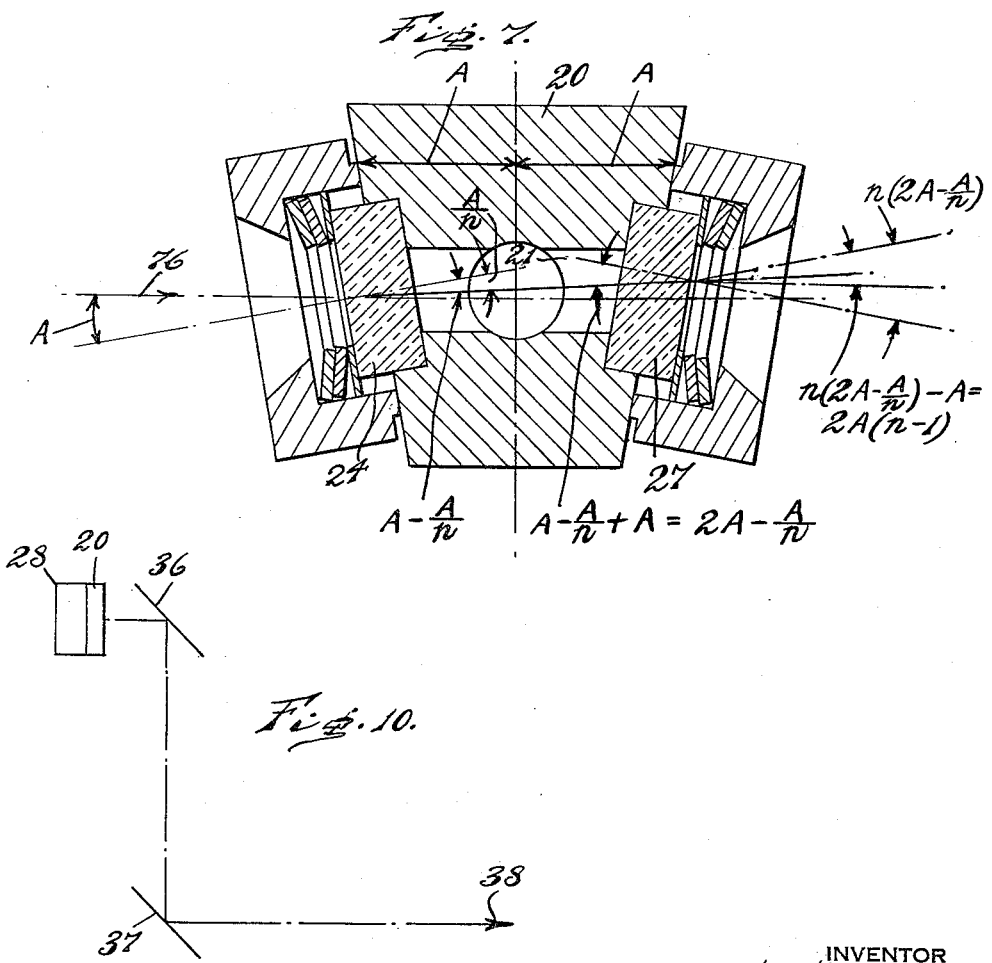
INVENTOR
Robert D. Neyer
BY
ATTORNEYS Sept. 11, 1962 R. D. NEYER 3,053,089
DIFFERENTIAL DIFFRACTION LIQUID LEVEL GAUGE
Filed Oct. 31, 1957 4 Sheets-Sheet 4

$$Tan D = \frac{d}{L}$$

$$L = \frac{d}{tan D} = \frac{d}{tan I (n-1)}$$

INVENTOR
Robert D. Neyer
BY
ATTORNEYS

United States Patent Office 3,053,089
Patented Sept. 11, 1962

3,053,089
DIFFERENTIAL DIFFRACTION LIQUID
LEVEL GAUGE
Robert D. Neyer, Oreland, Pa., assignor to Yarnall-Waring Company, Philadelphia, Pa., a corporation of Pennsylvania
Filed Oct. 31, 1957, Ser. No. 694,062
2 Claims. (Cl. 73—293)

The present invention relates to differential diffraction liquid level gauges.

The present application is a continuation-in-part of my copending application, Serial No. 645,998, filed March 14, 1957, now abandoned, for Differential Diffraction Liquid Level Gauge.

A purpose of the invention is to increase the brightness of the indication by a differential diffraction liquid level gauge.

A further purpose is to avoid the use of lenses between the source of light and the gauge which produce focusing and subsequent divergence of the light, and to accomplish illumination while avoiding diffusing or transluscent screens.

A further purpose is to obtain a series of intense parallel rays of one color by light passing through the liquid space and a series of intense parallel rays of another color from light passed through the vapor space, certain of the parallel rays of each color being directed in the same direction.

A further purpose is to illuminate a plurality of windows of a liquid level gauge from different portions of the internal reflecting surface of the same electric sealed beam spotlight.

A further purpose is to obtain a sparkling effect as condensate strikes the meniscus of the liquid under the intense parallel beam illumination.

A further purpose in a differential diffraction liquid level gauge is to provide a gauge body having interior gauge space connected to liquid and vapor at the bottom and top respectively and having aligned windows at the rear and front disposed in laterally converging relation, with laterally displaced light filters of contrasting light transmission colors placed behind the rear window at a distance from the rear window sufficient to provide a light source projecting light through the filters to the rear window at angles which in the liquid space project light through the front window in the form of parallel rays of a first color, laterally displaced diverging rays of the first color, somewhat deflected parallel rays of a second color, and laterally displaced diverging rays of a second color, and which in the vapor space project light through the front window in the form of parallel rays of the second color certain of which at a distance are vertically in line with certain of the parallel rays of the first color, laterally displaced diverging rays of the second color, somewhat deflected parallel rays of the first color, and laterally displaced diverging rays of the first color, and then to provide in front of the gauge an optical system receiving light from the front window and transmitting to the observer those parallel rays of the first color and of the second color which are vertically in line at a distance, the optical angle of the optical system being too narrow to transmit the undesired rays.

A further purpose is to dispose the front and back windows at an angle less than a right angle with respect to the lateral axis of the gauge body.

A further purpose is to set one of the windows, preferably the front window, at a right angle to the axis of the gauge body.

A further purpose is to place the color filters behind the rear window, a distance greater than $$L = \frac{d}{\tan I\,(n-1)}$$

where
$d$ = width of rear window
$I$ = angle of incidence
$n$ = refractive index of rear window.

A further purpose is to place the color filters behind the rear window a distance about 10 times the width of the rear window.

A further purpose is to employ a mean spacing between the interior of the front and rear windows which does not exceed 2½ times the mean width of the windows.

A further purpose is to provide an angle between the planes of the front and rear windows which does not exceed 30 degrees, preferably about 20 degrees.

Further purposes appear in the specification and in the claims.

In the drawings I have chosen to illustrate a few only of the numerous embodiments in which my invention may appear, selecting the forms shown from the standpoints of convenience in illustration, satisfactory operation and clear demonstration of the principles involved.

FIGURE 1 is a side elevation of the gauge of the invention.

FIGURE 2 is a front elevation of the gauge of FIGURE 1.

FIGURE 3 is a diagrammatic top plan view of one embodiment of the invention, showing light transmission from the green area, that is, the light passing through the liquid in the gauge.

FIGURE 4 is a view corresponding to FIGURE 3 showing the light transmitted through the red area, that is, the vapor space above the liquid.

FIGURE 5 is a view of a modification of FIGURE 3 but looking in the same direction as in FIGURE 3, and showing the light transmitted through the green area, that is, through the liquid.

FIGURE 6 is a view of the device of FIGURE 5, the view being similar to FIGURE 3, and showing the light transmitted through the red area, that is, the vapor space above the level of the liquid.

FIGURE 7 is an enlarged fragmentary transverse section corresponding to a section on the line 7—7 of FIGURE 1, illustrating the gauge construction of FIGURES 3 and 4.

FIGURE 10 is a diagram of the mirror arrangement.

Figure 8:
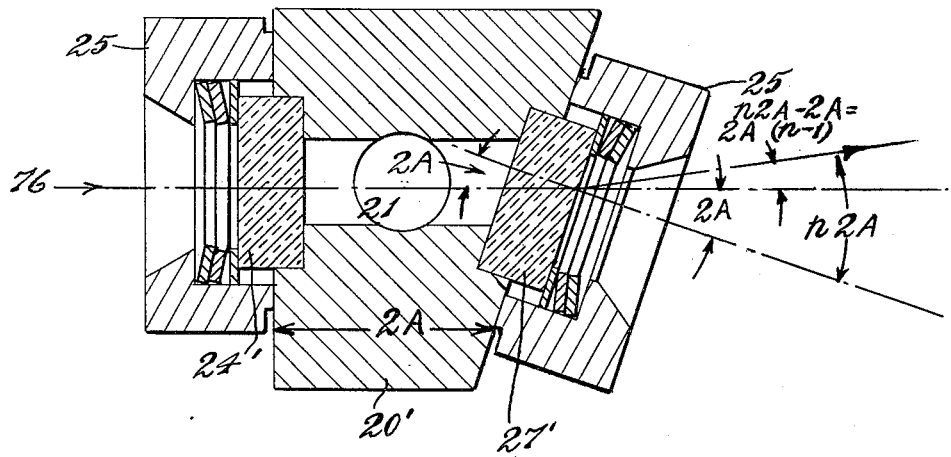
FIGURE 8 is a transverse section similar to FIGURE 7, showing the gauge construction of FIGURES 5 and 6.

Describing in illustration but not in limitation and referring to the drawings:

In the prior art bicolor illumination of liquid level gauges has been obtained as described in Blackburn United States Patent 2,024,815.

The prior art illuminators of this type have suffered from lack of light intensity and lack of sharp contrast at the point of liquid level, which have made it impractical to use such gauges at considerable distance, under circumstances of poor visibility due to the presence of smoke or steam, or where precise vision is required to distinguish between the indications of a number of closely related gauges.

The difficulties of the prior art have, it is believed, originated from the constructions used by which light from a spotlight or the like has passed through transluscent or diffusing color filters and then through a strip lens which diffuses the light.

Beyond the lens the light has in the prior art devices passed through an inclined window into an interior gauge space which is in effect a triangular prism. Thus in one area, for example, the water space, a particular color, say red, is refracted to one side of the front window so that it does not leave the interior of the gauge. The other color, for example green, is refracted to a position in line with the front window and regardless of the position of the observer in front of the opposing window he sees only green in this space. In the steam space on the other hand, the action is just the reverse. One color, for example red, is refracted into line with the front window and is seen through the window, while the other color, for example green, is not refracted far enough to leave the interior of the gauge.

Various difficulties have occurred in the prior art in using devices of this kind. The intensity of illumination has been very limited, so that the observer at a distance sometimes has difficulty determining what the water level really is.

The focusing effect of the strip lens used in the prior art practice causes light leaving the gauge at the front window to diverge. This produces a condition which is unfavorable to maintaining adequate intensity of light at the position of a distant observer.

The difference in the index of refraction in the liquid and in the steam within the gauge causes the corresponding colors, for example green and red, to be seen at a mean angle which is different for the different colors. Thus the observer who may be in a position to see the green at full brightness is not in a position to see red at the full brightness. Or if the observer moves to a position where he sees the red at full brightness he will not be advantageously placed to see the green. There has been further difficulty in the prior art due to the fact that because of the lens, color filters of the diffusing or translucent type have been used. This cuts down greatly on the percentage of light transmitted.

The prior art devices have depended on flooding a great excess of light on the relatively remote position, a comparatively small proportion of this light actually passing through the gauge because of the limited light transmission by the filter screens and the lack of concentration of the illuminating effect.

The prior art devices have also relied on light shutters to adjust the angles, employing rather complicated construction in this respect.

By the present invention, the brightness of the indication is greatly increased. Lenses and diffusing or transluscent screens are avoided.

The present invention produces an intense pencil of parallel rays of one color from light passing through the liquid space and of parallel rays of another color directed in the same direction from light passing through the steam space.

Also by the present invention a plurality of windows of the liquid level gauge are illuminated from different portions of the internal reflecting surface of the same electric sealed beam spotlight.

A sparkling effect is secured as condensate strikes the meniscus of the liquid under the intense parallel beam illumination.

In the device of the invention the gauge body has an interior gauge space connected to the liquid and vapor at the bottom and top respectively, and it has aligned windows at the rear and front disposed in laterally converging relation with laterally displaced light filters of contrasting light transmission colors placed behind the rear window at a distance sufficient to provide a light source projecting light through the filters and through the rear window at angles which in the liquid space provide light through the front window in the form of parallel rays of the first color, laterally displaced diverging rays of the first color and, somewhat deflected parallel rays of the second color and laterally displaced diverging rays of a second color, and which in the vapor space project light through the front window in the form of parallel rays of the second color, some of which are vertically in line with the parallel rays of the first color, laterally displaced diverging rays of the second color somewhat deflected parallel rays of the first color, and laterally displaced diverging rays of the first color. In front of the window an optical system, suitably consisting of mirrors, receives light from the front window and transmits the parallel rays of the first color and of the second color which are vertically in line to the observer, the optical angle of the optical system being too narrow to transmit the deflected parallel rays and the diverging rays.

In the system of the invention the position of maximum intensity of the red as observed by the viewer is the same as the position of maximum intensity of the green as observed by the viewer, and there is no diverging effect and no difference in the mean angles of the respective colors.

Both colors are emitted along a common path and both colors are emitted as parallel rays.

Direct transmission of light from the reflecting areas of the spotlight reaches each of the windows of the gauge and close coupling of spotlights and color screens with the gauge is employed, giving high light efficiency and providing compact design.

It is also possible by the invention to eliminate light shutters and reduce the power of spotlights.

The absence of transluscent color screens reduces primary color diffusion which has occurred in the past and gives a more clear and more positive indication of water level.

One of the interesting and novel effects produced in the present invention is a marked variation in refraction which occurs as boiler condensate drips down in the steam space and strikes the water meniscus, causing a momentary shimmering of the meniscus. This produces a very marked sparkling or shimmering effect due to the high intensity direct pencil of parallel rays rather than the diverging rays as in the prior art.

The gauge of the invention is a differential diffraction gauge as shown in FIGURES 1 and 2, having a gauge body 20 provided with an interior gauge space 21 extending vertically and closed at the top and bottom. The interior gauge space is connected to the boiler below the water level by flanged pipe 22 at the bottom and is connected to the boiler above the water level and in the steam space by flanged pipe 23 at the top.

At intervals along the length of the gauge body there are front windows 24 suitably of glass anchored by cover plates 25 secured by bolts 26. At the rear of the gauge there are similar windows 27 similarly mounted. The windows are suitably covered with mica and gasketed to the gauge body.

The front and rear windows are suitably opposed to one another and in line laterally, although diverging as later explained.

The question, of course, of whether the windows are individual discs or extend longitudinally the full length of the gauge is immaterial to the present invention.

Behind the rear window is mounted an illuminator housing 28 which comprises a metallic frame 30 which supports a series of vertically spaced electric sockets 31, individually mounting and lighting internal reflector sealed spotlights 32 which are directed toward the rear windows of the gauge, each spotlight desirably lining up with two of the rear windows.

In front of each spotlight in line with each window is placed a color filter bracket 33 which mounts in side-by-side relation a red transmitting filter 34 and a green transmitting filter 35. These two filters are the same distance from the spotlight and the same distance from the midpoint on the adjoining window.

As best seen in FIGURES 3, 4, 5, 6, 7, 8 and 9, the actual angle of the front and rear windows with the center line extending laterally across the gauge body, while not narrowly limited, will suitably be between 5 and 15 degrees with respect to the center line at each side, preferably about 10 degrees on each side. This means that the planes of the inner faces of the gauge glasses meet in an angle between 10 and 30 degrees, preferably about 20 degrees.

For example, in the discussion below, it will be assumed that the refractive index of steam is equal to that of air and is equal to unity. It will also be assumed that the refractive index of a liquid such as water in the gauge is equal to the index of refraction of the glass. Actually the index of refraction of the water will change with the density, and where high boiler pressures are involved the index of refraction of the water will decrease and that of the steam will increase until they are equal at critical pressure conditions.

It will be evident, however, that these assumptions, while making for simplicity, do not affect the validity of the operating principles, under any pressure conditions below critical pressure.

The gauge of the invention is viewed ordinarily from a considerable distance by the use of mirrors. Thus, with the gauge assembly shown in FIGURE 10, a mirror 36 extending diagonally across the front reflects the image of the red and green parallel rays which are vertically in line down, and a mirror 37 suitably at eye level reflects the image out toward the distant observer as indicated by the arrow 38.

In many installations the optical distance between the gauge and the observer is of the order of 100 feet or more. The range of the lateral angle through which the gauge is visible as limited by the lateral width of the mirrors is of the order of 0.5 degrees.

Under these conditions the light which reaches the observer is essentially a pencil of parallel green rays and a pencil of parallel red rays which are vertically in line, directed initially through the front windows of the gauge.

The explanation of the optical principles can therefore be outlined in a simple manner by tracing rays of light back from the observer to the ultimate source.

Considering first FIGURES 3 and 4, FIGURE 3 illustrates the optical relationship of a water-filled gauge space and FIGURE 4 shows the optical relationships of the steam-filled gauge space.

In FIGURE 3, showing the light refraction through the water-filled gauge space, light reflected from built-in reflector portion 40 of spotlight 32 is transmitted through green filter 35, through the rear window glass 27, through the gauge interior space 21 and out the front window glass 24. An envelope 40' surrounds the parallel rays to indicate that applicant is dealing with the parallel rays and not excluding the possibility that surrounding them there may be other rays with which he is not concerned which will not necessarily be parallel. The parallel rays of light passing through the filter 35 and through the aperture of the gauge forms a green band 41 entering the rear window, and by the refraction in the water space this light is emitted as a parallel green pencil of rays defined by limits 42 and 43 and diverging green pencils of rays defined by limits of rays 43 to 44 and 42 to 49, as shown in the extreme left in FIGURE 3.

From the portion 45 of the internal reflector, light in a band passes through red filter 34, positioned besides green filter 35, forming a band of red light 46 which enters the rear window 27 of the gauge, passes through the interior gauge space 21, and is emitted through the front window 24 in the form of a parallel red pencil of rays from 47 to 48 and diverging red pencils of rays in the zones from 48 to 50 and 47 to 39 refracted by the water. The envelope 40' which surrounds portion 45 has been previously described.

It will be evident that as seen in FIGURE 3, in the water space there is a band of parallel green rays from 42 to 43 which is unmixed with red rays from the water space, as viewed by the distant observer 51. Since the optical angle of the mirror system is not wide enough to include any red rays from the water space, no red light from this space reaches the observer 51.

On the other hand, as shown in FIGURE 4, in the vapor space where the red light is visible to the observer, light from the reflecting area 45 passes through the red filter 34, forming red light band 46 which passes through the rear window 27, the interior gauge space 21 and out the front window 24. This produces at the front window a parallel pencil of red rays in the zone from 52 to 53 and diverging red rays in the zones from 53 to 54 and 52 to 59.

The green rays in the pencil 41 are refracted in the steam space to pass therefrom as diverging green rays in the zone from 55 to 56 and 57 to 58 and parallel green rays in the zone from 56 to 57.

As seen in FIGURE 4, there is a zone of parallel red rays from 52 to 53 unmixed with any green rays from the steam space, as viewed by the distant observer 51. The parallel red rays in the band from 52 to 53 adjoin diverging red rays from 53 to 54 on one side and from 52 to 59 on the other side. Likewise in the steam space, as shown in FIGURE 4, there is a band of parallel green rays from 56 to 57 and there are diverging green rays in the band 55 to 56 and also diverging green rays in the band from 57 to 58.

However, the zone from 42 to 43 of unmixed parallel green rays from the water space and the zone from 52 to 53 of unmixed parallel red rays from the steam space are respectively one above the other and vertically in line so that they are picked up by the narrow angle optical (mirror) system and seen by the observer 51 at the same position located at a distance.

It will be noted that although the contrasting colors, which for the purpose of discussion have been referred to above as red and green, but which can be any other suitable contrasting colors having a substantial difference in wave length, tend to overlap as viewed at close range, they are sharply differentiated when viewed at an optical system of narrow angle.

FIGURES 5 and 6 show a modified construction in which the front window is normal to the line of sight of the observer and the rear window is in the same angular relation thereto as in the form of FIGURES 3 and 4. This difference is indicated by showing the gauge body 20' in the form of a trapezoid with front window 24' normal to the observer and rear window 27' at right angles. It will be evident that in this case the entire differential refractive effect takes place at the rear window and the analysis can be greatly simplified. In this case, as shown in FIGURE 5, in the water zone or water area, light from internal sealed beam reflector section 40 passes through green filter 35 to form pencil of green rays 41 which passes through rear window 27', through the gauge interior space 21 and through front window 24' in the form of parallel green rays extending in the zone from 60 to 61 and diverging green rays in the zones from 61 to 63 and 60 to 62. In this same area, a pencil of red rays 46 passes through rear window 27', interior gauge space 21 and out front window 24', in the form of parallel red rays in the zone from 64 to 65 and diverging red rays in the zones from 65 to 67 and 64 to 66.

Thus as viewed close up there is a zone of parallel green rays from 66 to 60 emitted by the water space which is unmixed with red rays, but as viewed by the distant observer these parallel green rays unmixed by red rays extend throughout the zone from 60 to 61, and anywhere from this zone the narrow angular optical (mirror) system picks up only green rays from the water space.

In the steam space or red zone as shown in FIGURE 6, a pencil of red rays 46 passes through the rear window of the interior space and out the front window and is emitted as parallel red rays in the zone from 68 to 69 and forms diverging red rays in the zones from 69 to 71 and 68 to 70. Likewise a pencil of green rays 41 passes through the rear window 27', through the interior space and out the front window 24' and is refracted to form parallel green rays in the zone from 72 to 73 and diverging green rays in the zones from 72 to 74 and 73 to 75.

Thus in FIGURE 6 there is a zone of parallel red rays from 69 to 74 unmixed by green rays emitted from the steam space as viewed in close up, but as seen by the distant observer there are parallel red rays unmixed with green rays in the zone from 68 to 69, and the narrow band optical (mirror) system can pick up parallel red rays unmixed by green rays anywhere in this zone.

Since from the standpoint of the distant observer the optical system picks up parallel green rays of the zone from 60 to 61 and immediately vertically above parallel red rays in the zone from 68 to 69, the observer from some distant point sees green rays emitted from the water space and red rays emitted from the steam space.

The analysis will be better understood by reference to FIGURE 8, which shows the gauge of FIGURES 5 and 6 more in detail. This analysis traces back the rays to the source.

A beam of light 76 passes through the front window 24' with deviation. At the rear window 27' the angular inclination of the glass and any difference of refractive index between the fluid content and the glass causes a change in direction. If it is assumed that the difference in refractive index between the glass and the water-filled space is negligible, the light path will not be changed until the outer face of the window 27' is reached. At this point the beam will deviate in direction in accordance with the incidence angle and the differential index according to the relation $$n = \frac{\sin A}{\sin B}$$

where angle A is angle of incidence, angle B is angle of refraction. Thus angle $B = \sin^{-1}(n \sin A)$.

From a practical standpoint, the light deviation between the steam and water-filled portions of the gauge is essentially the same for the form of FIGURES 3 and 4 and the form of FIGURES 5 and 6. Although the index of refraction $n$ is expressed as a ratio of the sines of the angle of incidence and the angle of refraction of the light beam travelling through a plane surface, the values of the sines are closely proportional to the angles themselves provided the angles are relatively small as in the present case. Thus the results can be expressed in simplified form in terms of angles. The mean departure from true proportionality as applied to this case is indicated by the difference in values between the sine of ⅓ of a 20° angle and ⅓ of the sine of 20°. The respective values are 0.116 and 0.113. The difference corresponds to an error which is only about 2.5 percent maximum, well within the tolerance of the device.

From the above simplified relations it is possible to demonstrate general optical equivalency of the form of FIGURES 3 and 4 and the form of FIGURES 5 and 6 by considering FIGURE 7 and FIGURE 8. If a light beam 76 in FIGURE 7 strikes the front glass surface at incident angle A, it will be refracted through the gauge at refractive angle $$\frac{A}{n}$$

If it is assumed that the water-filled gauge has the same refractive index $n$ as the glass, the light beam will continue in the same direction until it leaves the rear window 27. At this point the incidence angle will be the deviation angle $$A - \frac{A}{n} + A = 2A - \frac{A}{n}$$

The refractive angle will be $$n\left(2A - \frac{A}{n}\right)$$

and the final deviation angle will be $$n\left(2A - \frac{A}{n}\right) - A = 2A(n-1)$$

Similarly in FIGURE 8, if the light beam 76 strikes the window 24' at a normal angle it will continue without deviation until it is emitted at the rear glass. If the included angle between the glasses is 2A, the incidence angle will be 2A and the refractive angle will also be $n2A$. The deviation angle will therefore be $$n2A - 2A = 2A(n-1)$$

which is the same as above.

This demonstrates the equivalency between the two forms within reasonable limits.

Even if the refractive index of the content liquid varies from that of the glass, the deviation angle will be determined solely by the refractive index of the liquid as long as the separate glass faces are parallel. The effect of the glass with parallel faces is merely to offset the beam but not to deviate the angle. Likewise the light path through the steam space of the gauge will only be offset but will not deviate appreciably until the index of refraction of the steam is significantly increased over that of air by increased density at higher pressures.

In order to differentiate the liquid and vapor-filled portions of the gauge by the characteristic light color over the full gauge aperture, the deviation of the respective light paths through the two media must be carried in back of the gauge for a minimum distance which is at least sufficient to eliminate light overlap of the respective color bands.

Figure 9:
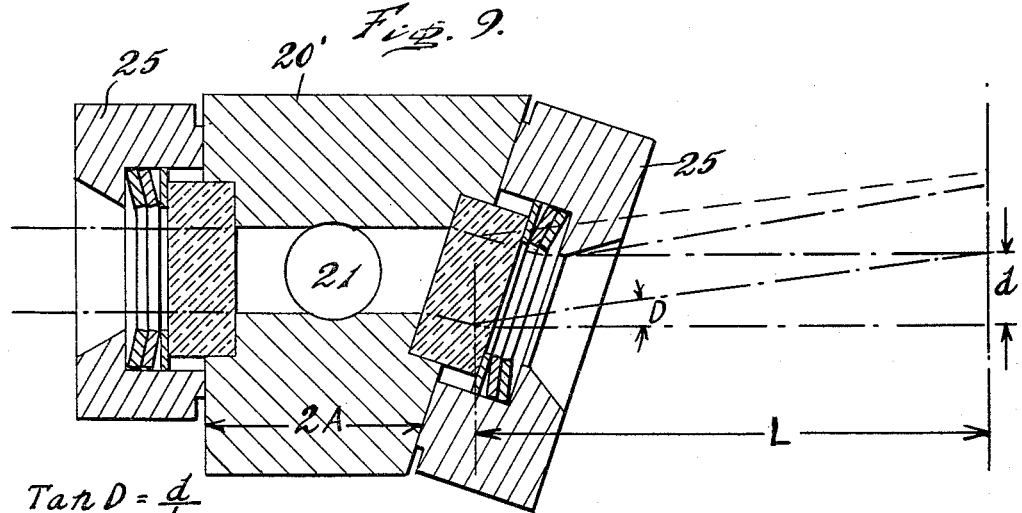
FIGURE 9 is a view similar to FIGURE 8, illustrating the same gauge construction, but showing the calculation of the spacing of the color filters to prevent interference.

FIGURE 9 shows that this deviation is $L \tan D = d$ where L is the minimum distance between the rear window and the angular filter unit, D is the angle of deviation and $d$ is the diameter of the window opening.

Since angle $D = I(n-1)$, where I is the angle of incidence, it follows that $$L = \frac{d}{\tan I(n-1)}$$

Since the index of refraction $n$ varies with the gauge interior pressure and since L is based on minimum requirements, the value of the index of refraction $n$ is based on the index of refraction of the liquid taken at rated operating conditions.

Actually the liquid in high pressure gauges is generally somewhat sub-cooled with respect to the steam pressure, but since the index of refraction for steam approaches closer to that of water, the two factors tend to compensate. If the distance L is less than the distance required to prevent overlap of the respective beams, both beams will show with corresponding reduction in contrast effect. The angle of incidence I is largely eliminated by the reduction in effective aperture through the gauge from the point of refractive beam deviation. In the form of FIGURES 3 and 4 light deviation is initiated at the inner face of the front window, and aperture reduction becomes a function of gauge body port length as well as thickness of the glass making up the rear window. The most efficient relation for a gauge of the type of FIGURES 3 and 4 is obtained when it is viewed at ½ the deviation angle or approximately 3° from the normal center line of a symmetrically mounted gauge.

In the form of FIGURES 5 and 6 the deviation is initiated at the rear window and the aperture reduction is limited to the path extending through the rear window. This can, however, be offset by increasing the radius of the cover opening to exceed the body opening by the deviation of the rays from the glass normal. The rear glass angle for the same effect in this case is twice as large as that for the first case and the effects produced are therefore correspondingly greater.

It will be appreciated that the larger angle I becomes the smaller effective aperture for a given size window opening. Efficient visibility therefore dictates that the incidence angle I be reasonably small. It is equally true, however, that the distance L will increase as incidence angle I decreases, and this necessitates a deeper illuminator housing and lowering light efficiency. This is also objectionable from the standpoint of space limitation and higher cost. A good compromise is obtained if the incidence angle is approximately 20°. Under these conditions it will be found that the distance L should be approximately 10 times the aperture opening $d$. It will also be evident that if the front face of the gauge is positioned normal to the emitted light, the center of the illumination system is shifted slightly to one side, which may necessitate slight readjustments of the light housing for good results. While there are basic advantages in this construction, it appears more practical in general to equalize the angle of tilt between the front and rear window glasses with respect to the mean lateral center line of the gauge and to view the gauge at a slight angle equal to ½ the total deviation angle toward the heavy side of the gauge.

The distance between gauge glasses should be reduced to a practical minimum.

The loss in aperture in a lateral direction can be expressed as follows:

$$L_a = t \tan D$$

where $L_a$ is the loss in aperture, D is the deviation angle and $t$ is the body thickness of the gauge between gauge glasses.

When viewed at the most effective angle along the lines previously discussed the actual loss of aperture can be reduced to about one-half of that indicated by the deviation angle following passage of light through the front glass (with reference to FIGURE 7) or in terms of the initial light angle A $$L_a = t \cdot \frac{\tan}{2} \left[ \frac{A(n-1)}{n} \right]$$

If the angle of incidence is 20°, $n=1.3$, $t=1.5$ inches, $$L_a = 1.5 \; \frac{\tan 4.6°}{2} = 0.06 \text{ inches}$$

This is equivalent to an aperture reduction of 10 percent. It is undesirable therefore to place the glasses appreciably farther apart than 2 or 2½ times the aperture diameter. In short, therefore, the mean spacing between the glasses should not exceed 2½ times the diameter of the body port opening or the width of the window opening, and the color filter screen should be located approximately 10 diameters in back of the rear window having about a 20° inclined angle between front and rear window glasses.

As already explained, the optical angle of pick-up by the optical system which transmits the image to the observer should not be wide enough to extend beyond the width of the band of exclusively parallel green rays from the green space and exclusively parallel red rays from the red space.

It will be evident that in the gauge of the invention the body distance between opposing window glasses is as small as other conditions will permit.

Unlike device in the prior art, no attempt is made to prevent transmission of light through the gauge other than that desired at the observation point, but only the desired light is picked up by the optical system.

It will also be evident that no diffusion screen is used but an entirely transparent light filter is employed for each light color.

The light employed is reflected directly from the parabolic surface of the internal reflector spotlamp through a transparent color screen and through the gauge to the optical system to the observer.

The color screens are positioned between the lamp and the gauge at a distance from the gauge sufficient to allow complete color separation.

It will further be evident that according to the invention advantage is taken of the lateral extent of the mirror to exclude light outside the desired range and thereby permit transmission of other than the desired light through the gauge without interference with the indication from the gauge.

In view of my invention and disclosure variations and modifications to meet individual whim or particular need will doubtless become evident to others skilled in the art, to obtain all or part of the benefits of my invention without copying the structure and method shown, and I, therefore, claim all such insofar as they fall within the reasonable spirit and scope of my claims.

Having thus described my invention what I claim as new and desire to secure by Letters Patent is:

1. A direct view differential diffraction liquid level gauge, including a gauge body having an interior gauge space connected to liquid at the bottom and connected to vapor at the top, providing a liquid space at the bottom of the gauge space, providing a meniscus at the top of the liquid level, and providing a vapor space above the liquid space in the gauge space, and having rear and front windows including transparent window glasses angularly disposed in a 10° to 30° laterally converging relation, said windows being aligned with each other through said gauge space and with the mean spacing between the interiors of the rear and front windows not exceeding two and one-half times the mean window width, in combination with a sealed beam electric light behind the rear window having an internal reflector provided with spaced adjacent reflector areas, one of the spaced reflector areas acting as a source of white light for producing light of one color and the other of the spaced reflector areas acting as a source of white light for producing light of the other color, laterally displaced undiffused light filters individually corresponding to said reflector areas and passing light from said areas of the reflectors, each of said filters being directly in line with one of said reflector areas and with said rear window for each said rear and front windows to pass light of both of said colors throughout an aperture area common to both of said colors, the color filters being located behind the rear window a distance greater than $$\frac{d}{\tan I(n-1)}$$

where $d$ is the width of the rear window,
$I$ is the angle of incidence, that is, the angle between a beam of colored light which strikes the rear window and the normal to the plane of the surface of the rear window at the point where the beam of colored light strikes the rear window,
$n=$index of refraction of the glass in the rear window, whereby light from said reflector areas is passed to a distant observer through said filters and said windows and gauge space within a field having parallel rays of one color from the liquid space free from rays of the other color and having parallel rays of the other color from the vapor space directly above the rays from the liquid space free from rays of the one color, clearly defining the level of the meniscus, said rays passing from the color filters to the observer free from light divergence or convergence except for the action of the gauge itself, and means for a distant observer to view said front window in entirety and for confining the view of the observer to said field of said parallel rays of said colors.

2. A gauge of claim 1, in which the light filters are placed behind the rear window a distance of about ten times the width of the rear window.

References Cited in the file of this patent
UNITED STATES PATENTS

| | | |
|---|---|---|
| 2,024,815 | Blackburn | Dec. 17, 1935 |
| 2,603,090 | Brelsford | July 19, 1952 |

FOREIGN PATENTS

| | | |
|---|---|---|
| 751,241 | France | June 12, 1933 |

OTHER REFERENCES

"The Diamond Bi Color Water Gauge and Illuminator," a publication of Diamond Power Specialty Corp., Detroit, Michigan, Bulletin No. 847, Rec'd Division 36, January 2, 1934 (2 pp.). (Copy in Div. 36.)